(12) United States Patent
Choe et al.

(10) Patent No.: US 8,202,636 B2
(45) Date of Patent: Jun. 19, 2012

(54) MAGNETIC RECORDING CAPPING LAYER WITH MULTIPLE LAYERS FOR CONTROLLING ANISOTROPY FOR PERPENDICULAR RECORDING MEDIA

(75) Inventors: Gunn Choe, San Jose, CA (US); Yoshihiro Ikeda, San Jose, CA (US); Mohammad T. Mirzamaani, San Jose, CA (US); Kai Tang, San Jose, CA (US); Jinliu Wang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 170 days.

(21) Appl. No.: 12/317,650

(22) Filed: Dec. 23, 2008

(65) Prior Publication Data

US 2010/0159284 A1 Jun. 24, 2010

(51) Int. Cl.
*G11B 5/66* (2006.01)

(52) U.S. Cl. ............ 428/828.1; 428/827; 428/829; 428/830

(58) Field of Classification Search ............ 428/828.1
See application file for complete search history.

(56) References Cited

U.S. PATENT DOCUMENTS

| | | | |
|---|---|---|---|
| 6,468,670 B1 | 10/2002 | Ikeda et al. | |
| 6,773,826 B2 | 8/2004 | Nakagawa et al. | |
| 6,777,112 B1 | 8/2004 | Girt et al. | |
| 7,384,699 B2 | 6/2008 | Nolan et al. | |
| 2006/0263643 A1 | 11/2006 | Fullerton et al. | |
| 2006/0269797 A1 | 11/2006 | Lu et al. | |
| 2006/0286413 A1 | 12/2006 | Iiu et al. | |
| 2007/0087227 A1 | 4/2007 | Ma et al. | |
| 2007/0172705 A1 | 7/2007 | Weller et al. | |
| 2007/0243418 A1 | 10/2007 | Fullerton et al. | |
| 2007/0248843 A1 | 10/2007 | Wu et al. | |
| 2007/0292720 A1 | 12/2007 | Suess | |
| 2008/0057349 A1 | 3/2008 | Berger et al. | |
| 2008/0070065 A1 | 3/2008 | Berger et al. | |
| 2008/0075845 A1 | 3/2008 | Sonobe et al. | |
| 2008/0085426 A1 | 4/2008 | Kurita | |
| 2008/0138662 A1 | 6/2008 | Berger et al. | |
| 2009/0226763 A1 * | 9/2009 | Oka | 428/829 |

FOREIGN PATENT DOCUMENTS

| | | |
|---|---|---|
| JP | 11-232632 | 8/1999 |
| JP | 2003317221 | 11/2003 |
| JP | 2006351055 A * | 12/2006 |

OTHER PUBLICATIONS

G. Choe, et al., "Perpendicular Recording CoPtCrO Composite Media With Performance Enhancement Capping Layer", IEEE Trans on Mag., vol. 41, No. 10, pp. 3172-3174, Oct. 2005.
Y. Sonobe, et al., "Thermally Stable CGC Perpendicular Recording Media With Pt-Rich CoPtCr and Thin Pt Layers", IEEE Trans on Mag., vol. 38, No. 5, pp. 2006-2011, Sep. 2002.

(Continued)

*Primary Examiner* — Mark Ruthkosky
*Assistant Examiner* — Gary Harris
(74) *Attorney, Agent, or Firm* — Zilka-Kotab, PC

(57) ABSTRACT

A method is described for improving recording performance of a perpendicular media. The method includes controlling the anisotropy levels in different sublayers of the magnetic recording layers of the perpendicular media. Further, the different sublayers thicknesses can be altered to match the media to a particular head.

16 Claims, 6 Drawing Sheets

OTHER PUBLICATIONS

T. Thomson, et al., "Magnetic Anisotropy and Reversal Mechanisms In Dual Layer Exchanged Coupled Perpendicular Media", J.Appl Phys., 103, pp. 07F548-1-07548-3, Apr. 2008.

D. Suess, et al., "Exchange Spring Recording Media for Areal Densities Up to 10 Tbit/in superscript 2", JMMM 290-291, pp. 551-554, 2005.

L. Zhou, et al., "Quantum Theory of the Coercive Force and the Capping Effect for Magnetic Multilayers", Physical Review B, vol. 54, No. 14, pp. 9924-9930, Oct. 1996.

H.S. Jung, et al., "CoCrPtO-Based Granular Composite Perpendicular Recording Media", IEEE Trans on Mag, vol. 43, No. 6, pp. 2088-2290, Jun. 2007.

Y. Sonobe, et al., "Effect of Continuous Layer In CGC Perpendicular Recording Media", JMMM 303, pp. 292-295, 2006.

Y. Sonobe, et al., "Coupled Granular/Continuous Medium for Thermally Stable Perpendicular Magnetic Recording", JMMM 235, pp. 424-428, 2001.

* cited by examiner

MAGNETIC RECORDING CAPPING LAYER WITH MULTIPLE LAYERS FOR CONTROLLING ANISOTROPY FOR PERPENDICULAR RECORDING MEDIA

BACKGROUND OF THE INVENTION

1. Field of the Invention

This invention relates to perpendicular magnetic recording media, including continuous and patterned recording media, and more particularly to apparatus and methods for using specifically tailored anisotropy levels in a sublayer of the recording layer.

2. Description of the Related Art

Hard-disk drives provide data storage for data processing systems in computers and servers, and are becoming increasingly pervasive in media players, digital recorders, and other personal devices. Advances in hard-disk drive technology have made it possible for a user to store an immense amount of digital information on an increasingly small disk, and to selectively retrieve and alter portions of such information almost instantaneously. Particularly, recent developments have simplified hard-disk drive manufacturing while yielding increased track densities, thus promoting increased data storage capabilities at reduced costs.

In a hard-disk drive, rotating high precision media including an aluminum or glass substrate that is coated on one or both sides with thin films are used to store information in the form of magnetic patterns. Electromagnetic read/write heads suspended or floating only fractions of micro inches above the media are used to either record information onto the thin film media, or read information from it.

A read/write head writes information to the disk by creating an electromagnetic field to orient one or a cluster of magnetic grains, known as a bit, in one direction or the other. In longitudinal magnetic recording media applications, a magnetic recording layer has a magnetic c-axis (or easy axis) parallel to the disk plane. As the hard-drive industry is transitioning to perpendicular recording technology, adjustments are being made to adapt the disk media so that the magnetic easy axis (crystallographic c-axis) of the cobalt alloy recording layers grow perpendicular to the disk plane. Hexagonal Close Packed (HCP) cobalt alloys are typically used as a magnetic recording layer for perpendicular recording. Most media manufacturers now rely on a cobalt alloy with the incorporation of an oxide segregant to promote the formation of small and isolated grains.

To read information, magnetic patterns detected by the read/write head are converted into a series of pulses which are sent to the logic circuits to be converted to binary data and processed by the rest of the system. To write information, a write element located on the read/write head generates a magnetic write field that travels vertically through the magnetic recording layer and returns to the write element through a soft underlayer. In this manner, the write element magnetizes vertical regions, or bits, in the magnetic recording layer. Because of the easy axis orientation, each of these bits has a magnetization that points in a direction substantially perpendicular to the media surface. To increase the capacity of disk drives, manufacturers are continually striving to reduce the size of bits and the grains that comprise the bits.

The ability of individual magnetic grains to be magnetized in one direction or the other, however, poses problems where grains are extremely small. The superparamagnetic effect results when the product of a grain's volume (V) and its anisotropy energy ($K_u$) falls below a certain value such that the magnetization of that grain may flip spontaneously due to thermal excitations. Where this occurs, data stored on the disk is corrupted. Thus, while it is desirable to make smaller grains to support higher density recording with less noise, grain miniaturization is inherently limited by the superparamagnetic effect. To maintain thermal stability of the magnetic grains, material with high $K_u$ may be used for the magnetic layer. However, material with a high $K_u$ requires a stronger magnetic field to reverse the magnetic moment. Thus, the ability of the write head to write on magnetic material may be reduced where the magnetic layer has a high $K_u$ value.

The perpendicular magnetic recording medium is generally formed with a substrate, a soft magnetic underlayer (SUL), an interlayer, an exchange break layer, a perpendicular magnetic recording layer, and a protective layer for protecting the surface of the perpendicular magnetic recording layer. The performance of the recording layer is important for efficient recording.

Accordingly, a need exists for a practical, attainable apparatus, system, and method for improving the perpendicular magnetic recording layer. Beneficially, such an apparatus, system and method would increase the recording performance of the system. Such apparatuses, systems and methods are disclosed and claimed herein.

SUMMARY OF THE INVENTION

The present invention has been developed in response to the present state of the art, and in particular, in response to the problems and needs in the art that have not yet been fully solved by currently available apparatus, systems and methods. Accordingly, the present invention has been developed to provide apparatus, system and methods for improving the performance of the perpendicular magnetic recording layer.

Embodiment in accordance with the invention for a recording medium for perpendicular recording applications includes a soft magnetic underlayer (SUL) deposited on a nonmagnetic substrate and a perpendicular magnetic recording layer deposited below an overcoat layer and above the SUL. Further, an exchange break layer is generally located between the SUL and the perpendicular magnetic recording layer. The perpendicular recording layer includes a plurality of sublayers.

The magnetic recording layer includes three sublayers: one oxide sublayer, one exchange coupling sublayer and one capping sublayer. In one embodiment the capping sublayer includes a high anisotropy (Ms) layer on top of a low Ms layer. In an alternate embodiment, the capping sublayer includes a low Ms layer on top of a high Ms layer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the present invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
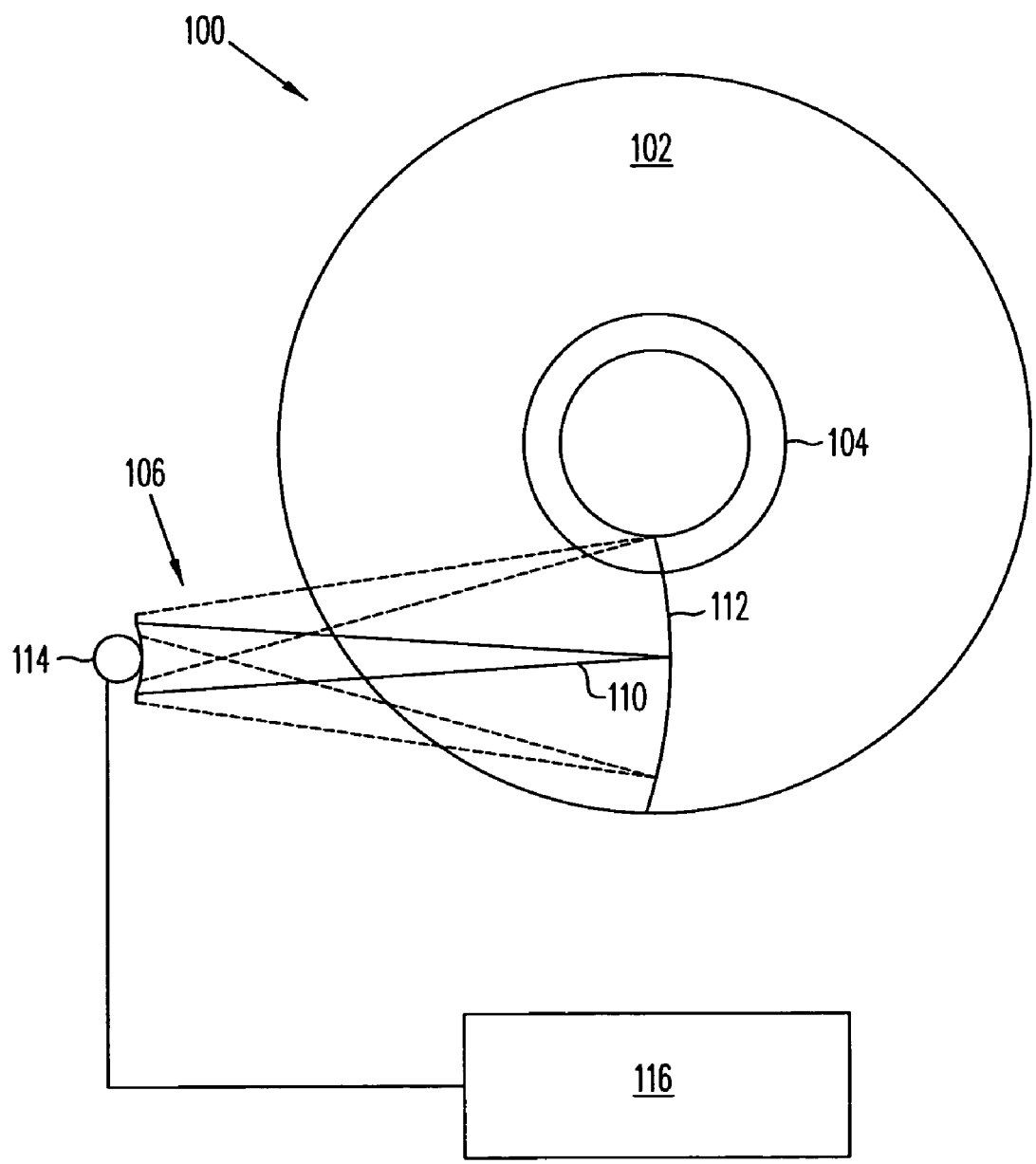
FIG. 1 is a schematic of a hard-disk drive.

Referring now to FIG. 1, a diagram of a conventional hard-disk drive assembly 100 is shown. A hard-disk drive assembly 100 generally comprises a plurality of hard disks comprising a perpendicular magnetic recording media 102, rotated at high speeds by a spindle motor (not shown) during operation. The perpendicular magnetic recording media 102 will be more fully described herein. Concentric data tracks 104 formed on either or both disk surfaces receive and store magnetic information.

A read/write head 110 may be moved across the disk surface by an actuator assembly 106, allowing the head 110 to read or write magnetic data to a particular track 104. The actuator assembly 106 may pivot on a pivot 114. The actuator assembly 106 may form part of a closed loop feedback system, known as servo control, which dynamically positions the read/write head 110 to compensate for thermal expansion of the perpendicular magnetic recording media 102 as well as vibrations and other disturbances. Also involved in the servo control system is a complex computational algorithm executed by a microprocessor, digital signal processor, or analog signal processor 116 that receives data address information from an associated computer, converts it to a location on the perpendicular magnetic recording media 102, and moves the read/write head 110 accordingly.

Specifically, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 104 to another. Upon referencing a servo pattern, the read/write head 110 obtains head position information that enables the control circuitry 116 to subsequently re-align the head 110 to correct any detected error.

Servo patterns may be contained in engineered servo sectors 112 embedded within a plurality of data tracks 104 to allow frequent sampling of the servo patterns for optimum disk drive performance. In a typical perpendicular magnetic recording media 102, embedded servo sectors 112 extend substantially radially from the perpendicular magnetic recording media 102 center, like spokes from the center of a wheel. Unlike spokes however, servo sectors 112 form a subtly arc-shaped path calibrated to substantially match the range of motion of the read/write head 110.

Figure 2:
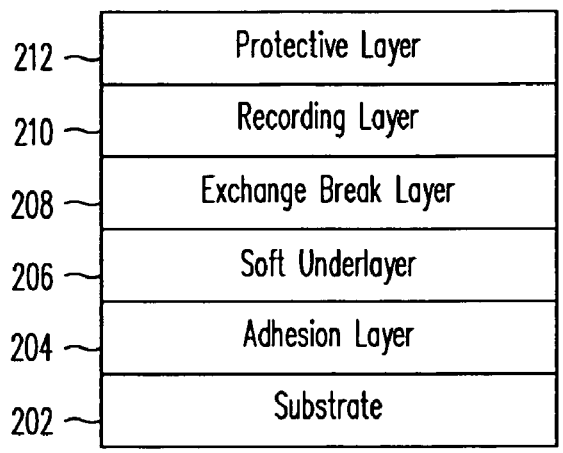
FIG. 2 is a cross-section view of the layers of a perpendicular recording media in accordance with one embodiment of the present invention.

FIG. 2 is a cross-sectional view of a typical perpendicular magnetic recording media 102. The layers shown in FIG. 2 may be deposited on a substrate 202 or on an adhesion layer 204 previously deposited on the substrate 202. The layers may include a soft underlayer (SUL) 206 an exchange break layer 208 (EBL), a perpendicular magnetic recording layer 210 and an overcoat 212. The perpendicular magnetic recording media 102 may include other layers not shown in FIG. 2. Similarly, one skilled in the art will recognize that some of the layers illustrated in FIG. 2 may be omitted in certain embodiments.

The platter or substrate 202 may comprise an AlMg or glass platter which provides a rigid support structure upon which the thin films are deposited. In certain embodiments ion beam deposition or magnetron sputtering may be utilized to deposit the various layers comprising the perpendicular magnetic recording media 102.

In one embodiment, the first layer deposited on substrate 202 is an adhesion layer 204. The adhesion layer 204 may comprise an AlTi layer to aid in the adhesion of subsequent layers. In certain embodiments the adhesion layer 204 may be omitted and a soft underlayer 206 may be deposited directly on the substrate 202. The material comprising the soft underlayer 206 is a soft, magnetic alloy. In certain embodiments the material comprising the soft underlayer 206 may be CoFeTaZr.

The soft underlayer 206 may also be formed as an antiferromagnetic structure. A coupling layer may be disposed between two soft underlayers to antiferromagnetically couple the two soft underlayers. The antiferromagnetic structure may be used to reduce magnetic signals originating from the soft underlayers where such signals are undesirable in the perpendicular magnetic recording media 102.

Above the soft underlayer 206 an exchange break layer 208 may be added. The exchange break layer helps to prevent the soft underlayer 206 from magnetically coupling to the magnetic recording layer 210.

The magnetic recording medium 102 also includes a magnetic recording layer 210 above the exchange break layer 208, to store data. The magnetic recording layer 210 may include thin films with a plurality of magnetic grains, each grain having a magnetic easy axis substantially perpendicular to the media surface. This allows the grains to be vertically magnetized. The magnetic grains may comprise a magnetic material such as CoPt or CoPtCr or CoPtCrB. To maintain a highly segregated magnetic layer, one or more segregants may be added to the magnetic material.

Above the magnetic recording layer 210 is a protective layer 212. The protective layer is generally made of a carbon bilayer, the bottom layer being CHx and the top layer being CNx. The protective layer both mechanically protects the magnetic recording layer 210 as well as prevents corrosion of the magnetic recording layer 210.

Figure 3A:
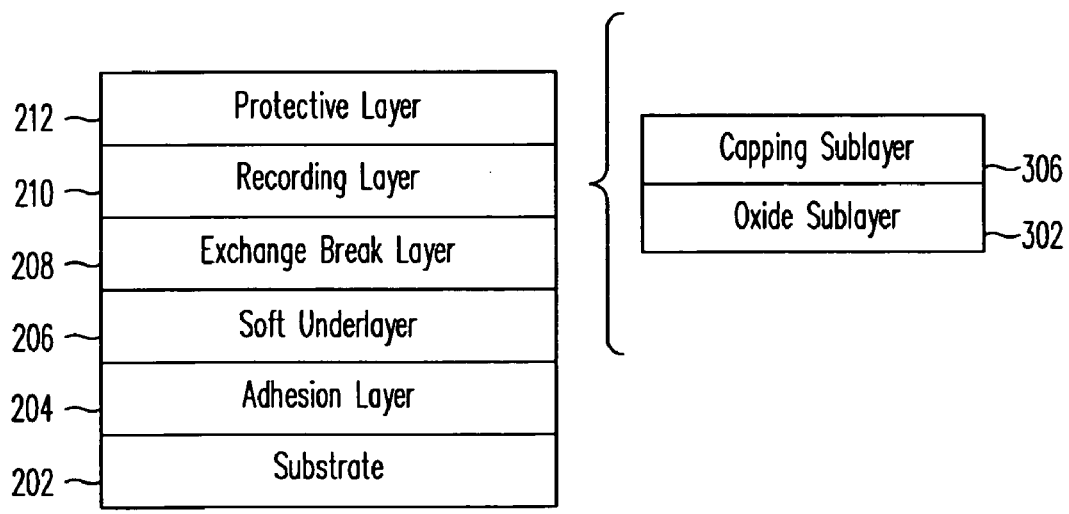
FIG. 3a is a view of one embodiment of a perpendicular recording media including a detailed view of the sublayers of the magnetic recording layer.
Figure 3B:
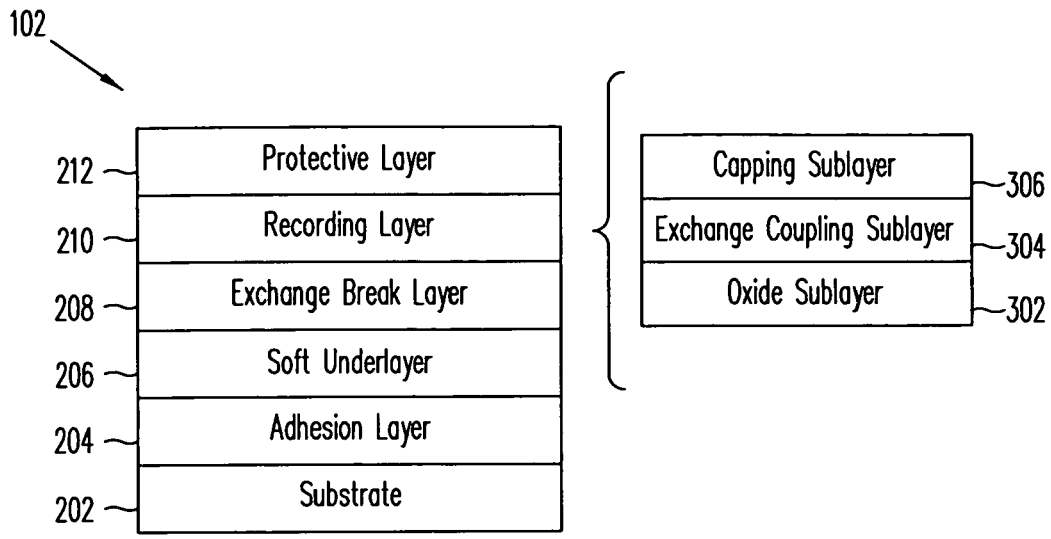
FIG. 3b is a view of second embodiment of a perpendicular recording media including a detailed view of the sublayers of the magnetic recording layer.

The magnetic recording layer 210 can be configured in different arrangements. FIGS. 3a and 3b describe two possible arrangement of the magnetic recording layer 210. FIG. 3a shows a media with magnetic recording layer 210 having two sublayers 302 and 306. The bottom sublayer 302 includes an oxide while the top sublayer, the capping sublayer (cap) 306, does not include an oxide. FIG. 3b shows a media similar to that of FIG. 3a, but with an exchange coupling layer (ECL) 304 inserted between the oxide sublayer 302 and the capping sublayer 306. The ECL 304 may be formed of materials such as Co alloys including Ru, Cr, Pt and/or B. The ECL 304 provides for a reduction of interfacial exchange coupling strength between the oxide sublayer 302 and the capping sublayer 306. In addition, various layers can be introduced between oxide sublayer 302 and capping sublayer 306 to improve the performance of the media. Oxide sublayer 302 is generally a CoPtCr alloy with one or more segregants including various oxides such as SiOx, TaOx, TiOx, CoOx, CrOx, and VOx and various elements such as B and Ti.

Figure 4A:
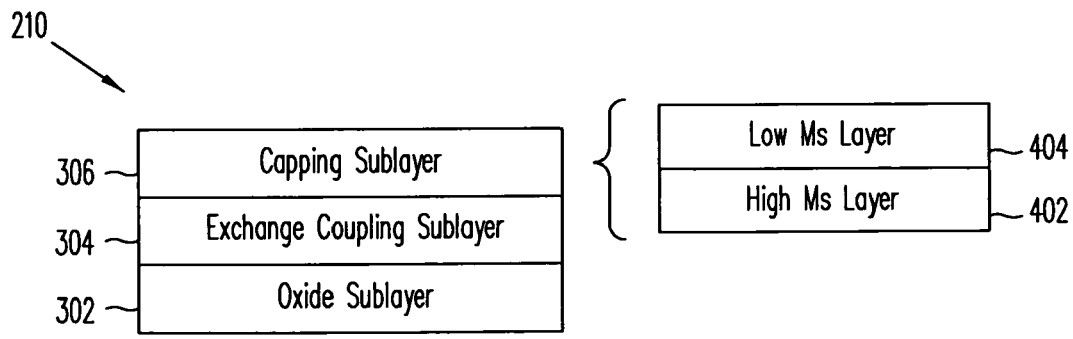
FIG. 4a is a view of an embodiment of a magnetic recording layer including a detailed view of the capping sublayer of the magnetic recording layer.

FIG. 4a is a cross section of the recording layer 210 showing a first possible arrangement for the capping sublayer 306. In this arrangement, the capping sublayer 306 includes a lower capping layer 402 with a high anisotropy (Ms) and an upper capping layer 404 with a low Ms. The Ms range for the low-Ms alloy is from 250 to 375 emu/cc and for the high-Ms alloy is from 375 to 550 emu/cc. The preferred ratio of Ms values of high-Ms to low-Ms alloys is from 1.2 to 1.4. Generally, both alloys are CoPtCrB and/or CoPtCr with compositions adjusted to achieve the desired Ms values. The high-Ms layer 402 is strongly coupled to the oxide magnetic sublayer 302 through the exchange control layer 304. This coupling leads to an increase of magnetic cluster size and improvement in media thermal stability. However, the high-Ms layer 402 introduces high noise. In order to provide a good media signal-to-noise ratio, a low-Ms layer 404 is placed on top of the high-Ms layer 402. The thickness ratio of the upper 404 to lower 402 capping layers in the media is 0.1 to 1. The preferred thickness ratio of the upper 404 to lower 402 capping layers in the media is 0.2 to 0.7. The thickness range of lower cap layer 402 is 2 to 6 nm and for upper cap layer 404 is 0.5 to 3 nm. The preferred thickness range of lower cap layer 402 is 2.5 to 4 nm and for upper cap layer 404 is 0.6 to 2 nm.

Table 1 shows experimental results of the media described in FIG. 4a (media 2) versus those in a typical structure of a media as shown in FIG. 3b (media 1) that uses a single magnetic alloy as the capping layer. Media 1 uses $CoPt_{18}Cr_{14}B_{10}$ as the capping layer while media 2 uses $CoPt_{18}Cr_{15}B_7$ as the lower capping layer 402 and $CoPt_{18}Cr_{20}B_4$ as the upper capping layer 404. Media 2 shows an improvement of 0.4-0.6 dB in signal-to-noise ratio over media 1. Moreover, the nucleation field of media 2 is −1947 Oe compared to −1699 Oe for media 1, indicating improved thermal stability.

TABLE 1

|  | 2TSNR$_{total}$ | 2TSoNR | 2TSNR | OW | T50/T | LFmV | RES | 2TMCW | Jitter/T |
|---|---|---|---|---|---|---|---|---|---|
| Media 1 | 19.0 | 28.0 | 19.5 | 36.1 | 1.37 | 18.0 | 53.88 | 95.7 | 0.113 |
| Media 2 | 19.6 | 28.4 | 20.1 | 42.0 | 1.29 | 19.39 | 54.69 | 98.7 | 0.112 |

Figure 4B:
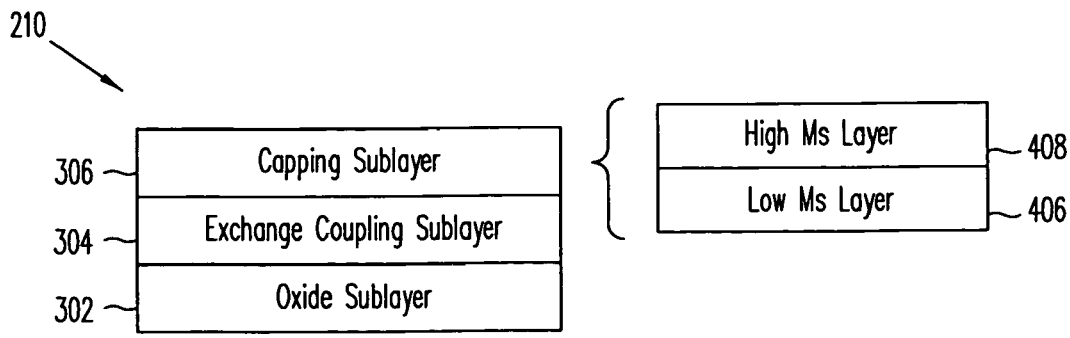
FIG. 4b is a view of another embodiment of a magnetic recording layer including a detailed view of the capping sublayer of the magnetic recording layer.

FIG. 4b is a cross section of the recording layer 210 showing a second possible arrangement for the capping sublayer 306. In this arrangement, the capping sublayer 306 includes a lower capping layer 406 with a low Ms and an upper capping layer 408 with a high Ms. This double layered capping sublayer 306 that has two layers with different Ms values allows for good media noise performance as well as good writeability and resolution. Further, by adjusting the ratio of the two different Ms capping layers 406 & 408, the media writeability can be flexibly controlled and tailored to the write head writeability. Thus the media can be manufactured for optimizing a recording system. In addition to enhanced magnetic performance, the media with this dual layer cap offers more corrosion robustness by employing more corrosion resistant materials in the capping sublayer. The media noise of the media of FIG. 4b is reduced by placing the low Ms (low exchange coupling) capping layer 406 adjacent to ECL layer, while the effective magnetic spacing is reduced and the media writeability is enhanced by depositing the high Ms capping layer 408 on top of low Ms capping layer 406. The Ms range of each component layer can be: 300-500 emu/cc for the granular oxide 302, 0-150 emu/cc for the ECL layer 304, 200-400 emu/cc for the low Ms capping layer 406 and 400-700 emu/cc for the high Ms capping layer 408. The thickness range of each component layer can be: 5-20 nm for granular oxide 302, 0.5-2 nm for ECL layer 304, 1-5 nm for low Ms capping layer 406 and 2-10 nm for high Ms capping layer 408. The thickness of the low Ms capping layer 406 to the high Ms capping layer 408 is between 3:1 and 1:1. The high Ms capping layer has an Ms of 150%-200% of that of the low Ms capping layer.

Figure 5:
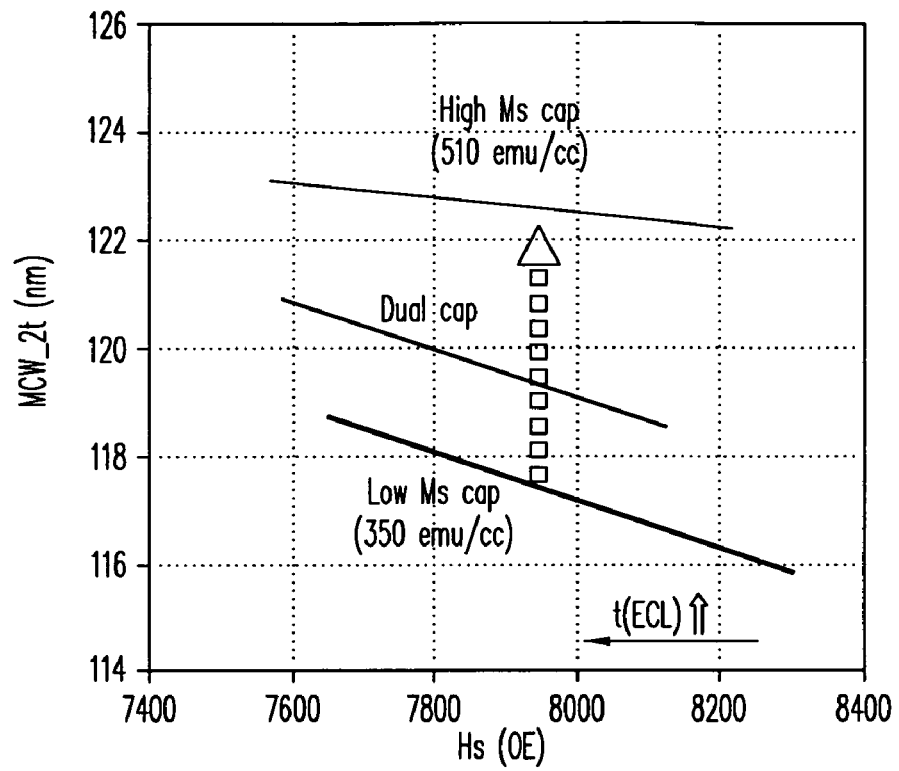
FIG. 5 is a graph of the change in MCW with respect to Hs for perpendicular media with different capping sublayer designs.

FIG. 5 shows the magnetic core width (measured at 2T=612 KFCI) of perpendicular media with different cap structures as a function of saturation field (Hs). The structure of the media tested in FIGS. 5-8 is from bottom to top: AlTi adhesion layer/SUL/Ru (for AF coupling of the two SUL layers)/SUL/CrTi seed/NiWCr fcc seed/Ru/CoPtCrSiTaO/CoPtCrSiO oxide sublayer/CoPtCrB ECL/capping sublayer/carbon overcoat. The three capping sublayer structures tested are a low Ms capping sublayer (350 emu/cc), a high Ms capping sublayer (510 emu/cc) and a dual layer capping sublayer as described in FIG. 4b (510 emu/cc capping layer over a 350 emu/cc capping layer). The different Hs values were obtained by changing the ECL thickness. A thinner ECL results in a higher Hs and narrower magnetic core width (MCW). The MCW of the media with high Ms capping sublayer (510 emu/cc) is substantially higher than that of media with low Ms capping sublayer (350 emu/cc) at the same Hs values, indicating higher media writeability with a higher Ms capping sublayer. The media with the dual layer capping sublayer (high Ms layer over a low Ms layer) show somewhat balanced writeability compared to the two media with different single Ms capping sublayers. This result suggests that the average Ms of the capping layers may determine the effective media writeability as demonstrated by the Hs of the media.

The writeability/Hs can also be controlled by varying the thickness of the two layers of the capping sublayer in a media with a dual layer cap. In other words, the higher the ratio of the high Ms capping layer 408 to the low Ms capping layer 406, the more the media MCW will behave as a media with a single capping sublayer with a high Ms. Conversely, the lower the ratio of the high Ms capping sublayer 408 to the low Ms capping sublayer 406, the more the media MCW will behave as a media with a single capping sublayer with a low Ms.

Figure 6:
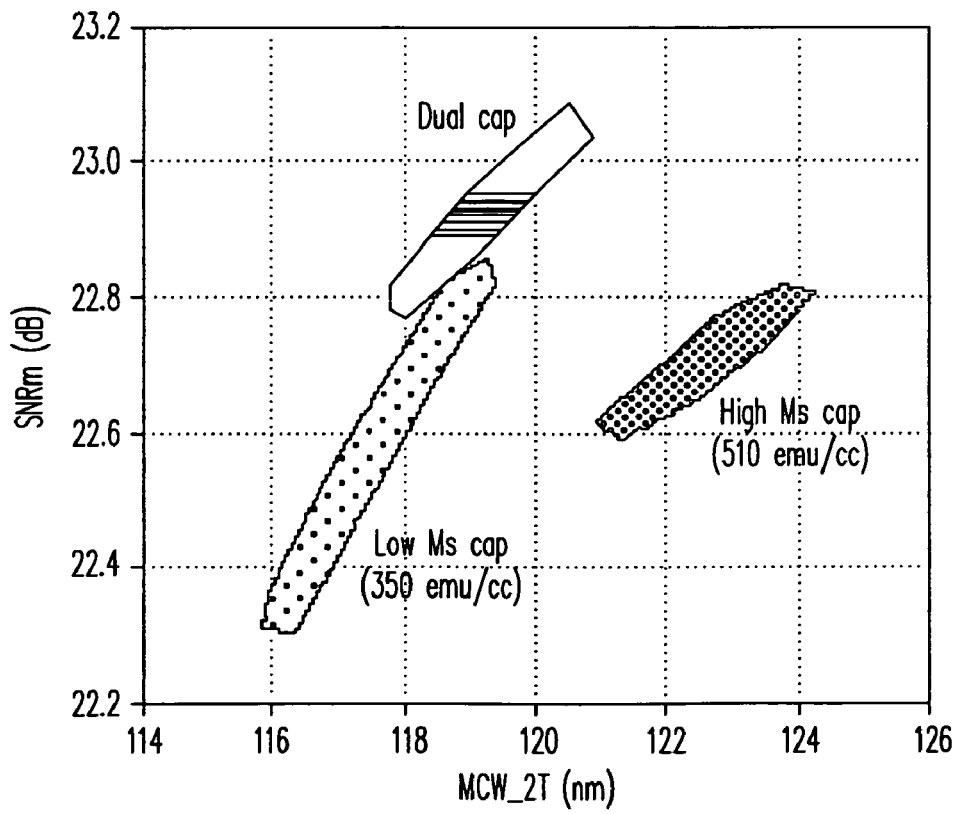
FIG. 6 is a graph of the change in SNRm with respect to MCW for perpendicular media with different capping sublayer designs.
Figure 7:
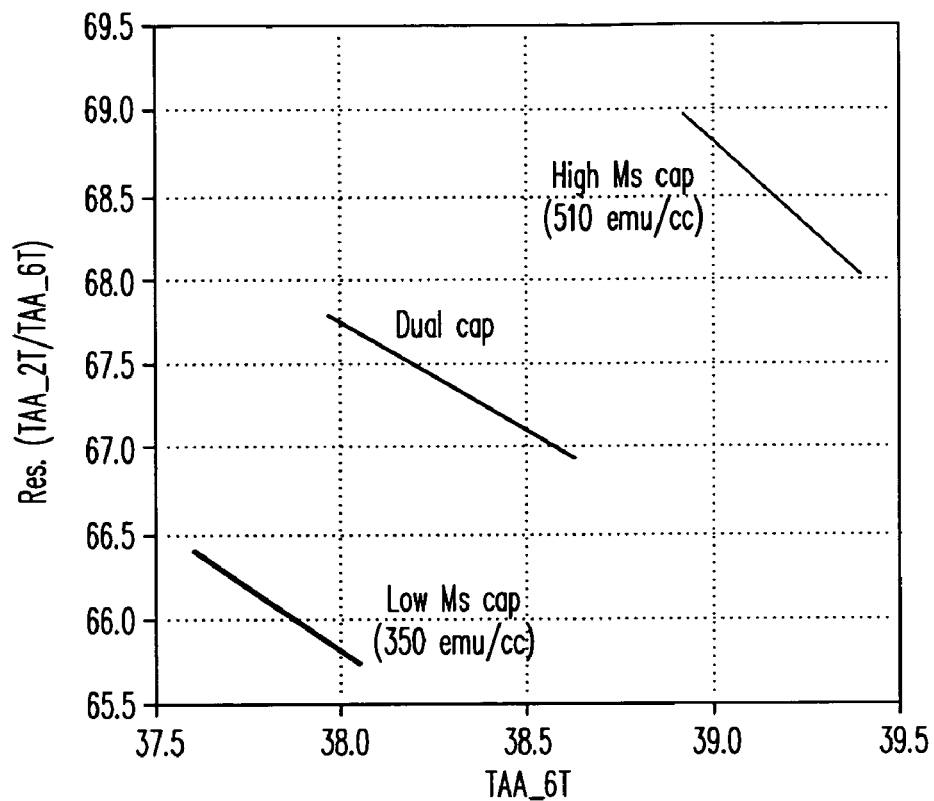
FIG. 7 is a graph of the resolution as a function of TAA for perpendicular media with different capping sublayer designs.

FIG. 6 shows the media signal-to-noise ratio as a function of MCW for the above three perpendicular media. In spite of a wider MCW of media with a single layer high Ms capping sublayer, the SNRm is not improved compared to media with a single layer low Ms capping sublayer, because of high exchange coupling of the high Ms capping sublayer generates high media jitter. The media with the low Ms capping sublayer shows similar SNRm but a narrower MCW and much lower OW than the media with high Ms capping sublayer. The media with the dual layer capping sublayer improves SNRm over the media with either a low or a high Ms single layer capping sublayer. The dual layer capping sublayer allows for good media noise performance without sacrificing the media resolution. Further, the dual layer capping sublayer can generally be thinner than a single layer capping sublayer. FIG. 7 shows the improvement in SNRm associated with media with a dual layer capping sublayer.

The granular oxide-to-cap layer exchange coupling is affected by the exchange energy of the ECL layer as well as the capping sublayer. Due to the interfacial exchange energy between oxide grains and the capping sublayer a local minimum Hs is present for each cap type. The ECL thickness at the minimum Hs is $t(ECL)_{min}$. The ECL of the media may be selected to be slightly thinner than the thickness of the media that minimizes the Hs of the media. A point to the left of the minimum is selected because points on the right of the minimum cause decoupling of capping sublayer and the oxide layer.

Figure 8:
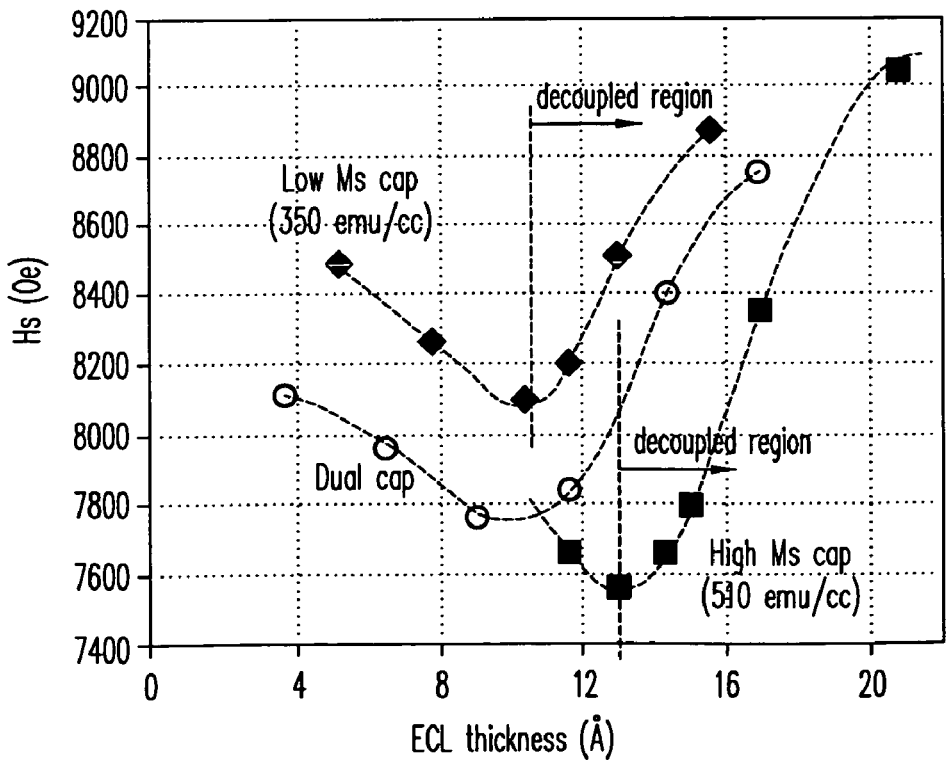
FIG. 8 is a graph of saturation field (Hs) as a function of exchange coupling layer thickness for perpendicular media with different capping sublayer design.

In general, for the dual layer capping structures described in FIG. 4b, as the exchange energy of the ECL layer decreases, $t(ECL)_{min}$ is decreased as well. Typically, the exchange energy of the ECL can be decreased by reducing Ms or $t(ECL)_{min}$. Similarly, as shown in FIG. 8, as the exchange energy of the cap layer decreases with lower Ms of cap layer, the $t(ECL)_{min}$ is also reduced. The minimum Hs value of media with a given coercivity (Hc) with lower Ms capping sublayer is substantially higher than that of the media with a higher Ms capping sublayer at similar Hc. When the media consists of a dual layer capping sublayer with a low Ms capping layer under a high Ms capping layer, the $t(ECL)_{min}$ is nearly the same as in the case of a media with single layered low Ms capping sublayer. This indicates that the cap alloy adjacent to ECL layer can dominate the coupling strength between oxide grain and capping sublayer due to its interfacial nature. The overall coupling between oxide and capping sublayers can be optimized by placing a relatively low Ms capping sublayer 406 onto the ECL layer 304. This coupling is a method to improve media jitter. On the other hand, good resolution with effectively reduced magnetic spacing is retainable by placing a high Ms capping layer 408 onto low Ms capping layer 406.

HDD write heads are manufactured with a wide range of variability in write widths. In particular, write heads for the same manufacturing program can be redesigned during the program. This design change may cause an alteration of the average write width of a write head. Further, intentional and unintentional manufacturing process differences for a particular write head design can cause the average write width of write heads to vary between process batches as well as between the individual heads from a single process batch. Some of the heads may have a smaller write width, relative to the average write width of the write head design, while other heads may have a larger write width than the average write width. In order to match media with these write heads with different write widths, a dual layer capping sublayer design offer tunable writeability by adjusting the low Ms-to-high Ms capping layer ratio. For example, for a write head with a lower write width, a higher ratio of high Ms capping layer to low Ms capping layer media can be matched with the write head to improve writeability. On the other hand, for a write head with a higher write width, a media with a lower ratio of high Ms capping layer to low Ms capping layer can be matched with the write head to improve writeability. In general, altering the capping sublayer structure to tune the media Hs to the write head tends to leave the SNR unchanged. Further, since only the thicknesses, rather than the compositions, of the top capping layer and the bottom capping layer are altered, no additional sputtering targets are required to implement the two (or more) media designs.

Figure 9:
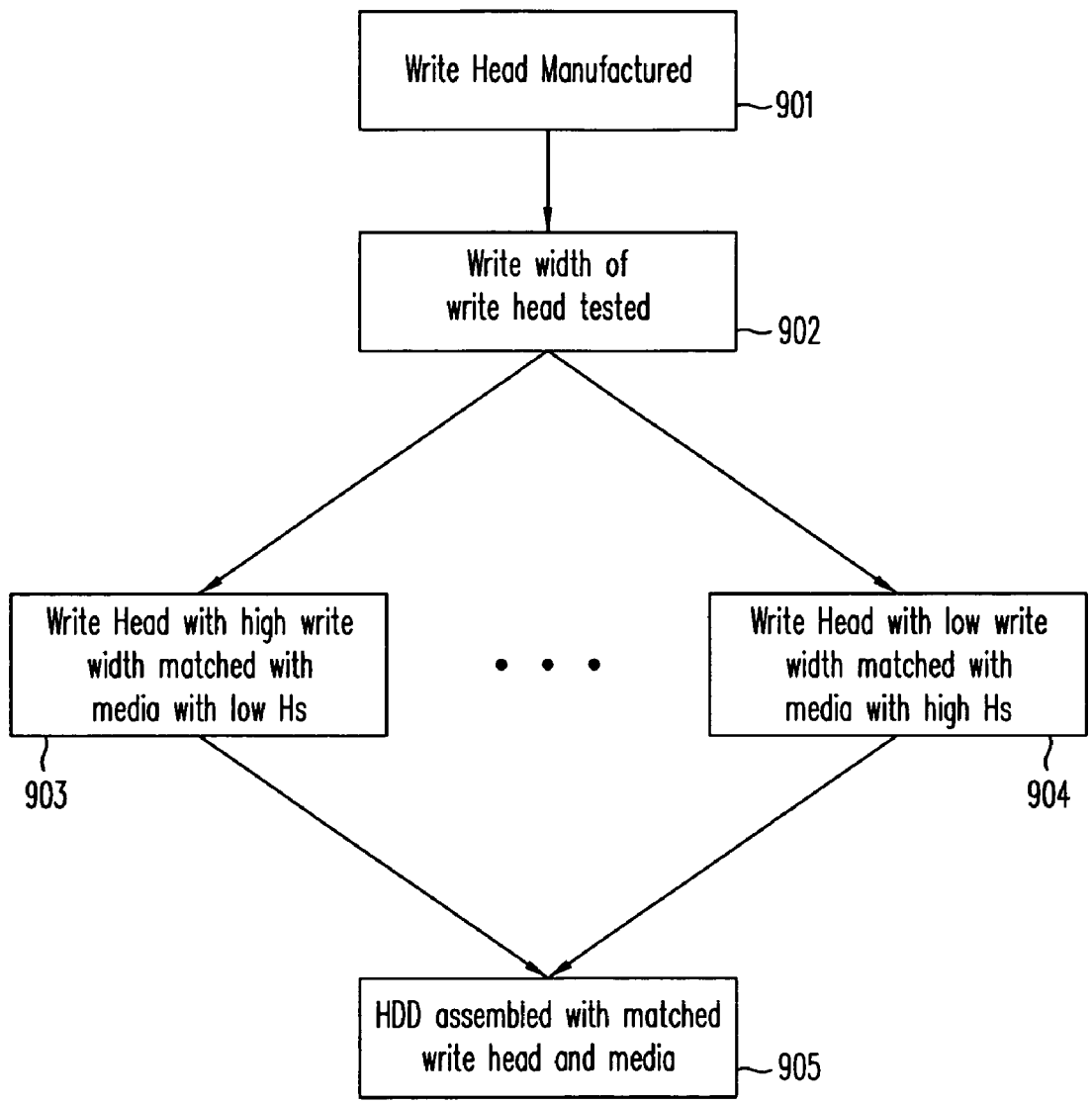
FIG. 9 is a flow diagram of a binning process to match write heads with a given write width to an appropriate media with a given Hs.

FIG. 9 is a flow diagram of a binning process to match write heads with a given write width to an appropriate media with a given Hs. First write heads are manufactured in a manufacturing plant 901. After the write heads are manufactured, the write width of the write heads are either individually or lot representatively tested 902. If the write head has a high write width the head is matched with a media with a lower Hs 903. If the write head has a low write width, the head is matched with a media with a higher Hs 904. The process is scaleable to any number of choices for write head/media combinations. For instance, a third option can be added which matches a medium write width head with a media with a medium Hs. After the write head and media are matched, the matched write head and media are integrated into the same hard disk drive 905.

The media is manufactured in a sputtering device with several chambers. In each chamber, one or more of the layers is sputtered one on top of the other over a substrate. The chambers include at least one sputter target with the elements of the layer that is to be sputtered. In addition, the chambers include gases, such as oxygen, that can affect the composition and properties of the sputtered layers. Lastly, the pressures in the chambers can be altered to affect the composition and properties of the various sputtered layers.

As an example, a substrate is sent into a first sputter chamber. In this first sputter chamber, an adhesion layer of AlTi is sputtered onto the substrate. The substrate is then passed to a second sputter chamber where a SUL layer of CoZrFeTa is sputtered onto the substrate. Next, the substrate is passed to a third sputter chamber where a EBL layer of Ru is sputtered onto the substrate. The substrate is then passed to successive sputter chambers to sputter the various sublayers of the magnetic recording layer and then the carbon overcoat layer. Lastly, lubricant is added to the substrate generally through a dipping process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A perpendicular recording media for a hard disk drive including:

a substrate;

a soft under layer above the substrate;

a magnetic recording layer above the soft underlayer comprising a magnetic sublayer;

an exchange coupling layer above the magnetic sublayer, and a cap layer above the exchange coupling layer; and an overcoat above the magnetic recording layer, wherein the cap layer includes a bottom cap layer with a anisotropy (Ms) between 375 and 550 emu/cc and a top cap layer with an Ms between 250 emu/cc and 375 emu/cc;

wherein the bottom cap layer is between 2.5 nm and 4 nm and the top cap layer is between 0.6 nm and 2 nm.

2. The perpendicular recording media of claim 1, wherein the magnetic sublayer includes an oxide.

3. The perpendicular recording media of claim 2, wherein the bottom cap layer has an Ms between 400 emu/cc and 500 emu/cc.

4. The perpendicular recording media of claim 2, wherein the top cap layer has an Ms between 290 emu/cc and 340 emu/cc.

5. The perpendicular recording media of claim 2, wherein the thickness ratio of the top cap layer to the bottom cap layer is between 0.1 and 1.

6. The perpendicular recording media of claim 5, wherein the thickness ratio of the top cap layer to the bottom cap layer is between 0.3 and 0.7.

7. The perpendicular recording media of claim 2, wherein the bottom cap layer has an Ms between 400 emu/cc and 500 emu/cc and the top cap layer has an Ms between 290 emu/cc and 340 emu/cc.

8. The perpendicular recording media of claim 7, wherein the thickness ratio of the top cap layer to the bottom cap layer is between 0.1 and 1.

9. The perpendicular recording media of claim 8, wherein the thickness ratio of the top cap layer to the bottom cap layer is between 0.2 and 0.7.

10. A perpendicular recording media including:

a substrate;

a soft under layer above the substrate;

a magnetic recording layer above the soft underlayer comprising a magnetic sublayer;

an exchange coupling layer above the magnetic sublayer;

and a cap layer above the exchange coupling layer;

and an overcoat above the magnetic recording layer, wherein the cap layer includes a bottom cap layer with an anisotropy (Ms) between 200 and 400 emu/cc and a top cap layer with an Ms between 400 emu/cc and 700 emu/cc;

wherein the top cap layer is between 2 nm and 10 nm and the bottom cap layer is between 1 nm and 5 nm.

11. The perpendicular recording media of claim 10, wherein the magnetic sublayer includes an oxide.

12. The perpendicular recording media of claim 11, wherein the bottom cap layer has an Ms between 250 emu/cc and 350 emu/cc.

13. The perpendicular recording media of claim 12, wherein the top cap layer has an Ms between 500 emu/cc and 600 emu/cc.

14. The perpendicular media of claim 11, wherein the bottom cap layer has an Ms between 250 emu/cc and 350 emu/cc and the top cap layer has an Ms between 500 emu/cc and 600 emu/cc.

15. The perpendicular media of claim 11, wherein the top cap layer is between 2 nm and 10 nm and the bottom cap later is between 1 nm and 5 nm; and the exchange coupling layer is between 0.5 nm and 2 nm.

16. The perpendicular media of claim 14, wherein the top cap layer is between 2 nm and 10 nm and the bottom cap later is between 1 nm and 5 nm; and the magnetic sublayer including an oxide is between 5 nm and 20 nm.

* * * * *